Nov. 11, 1952
E. W. FAHEY
2,617,543
EGG HANDLING APPARATUS
Filed Dec. 3, 1947
2 SHEETS—SHEET 1
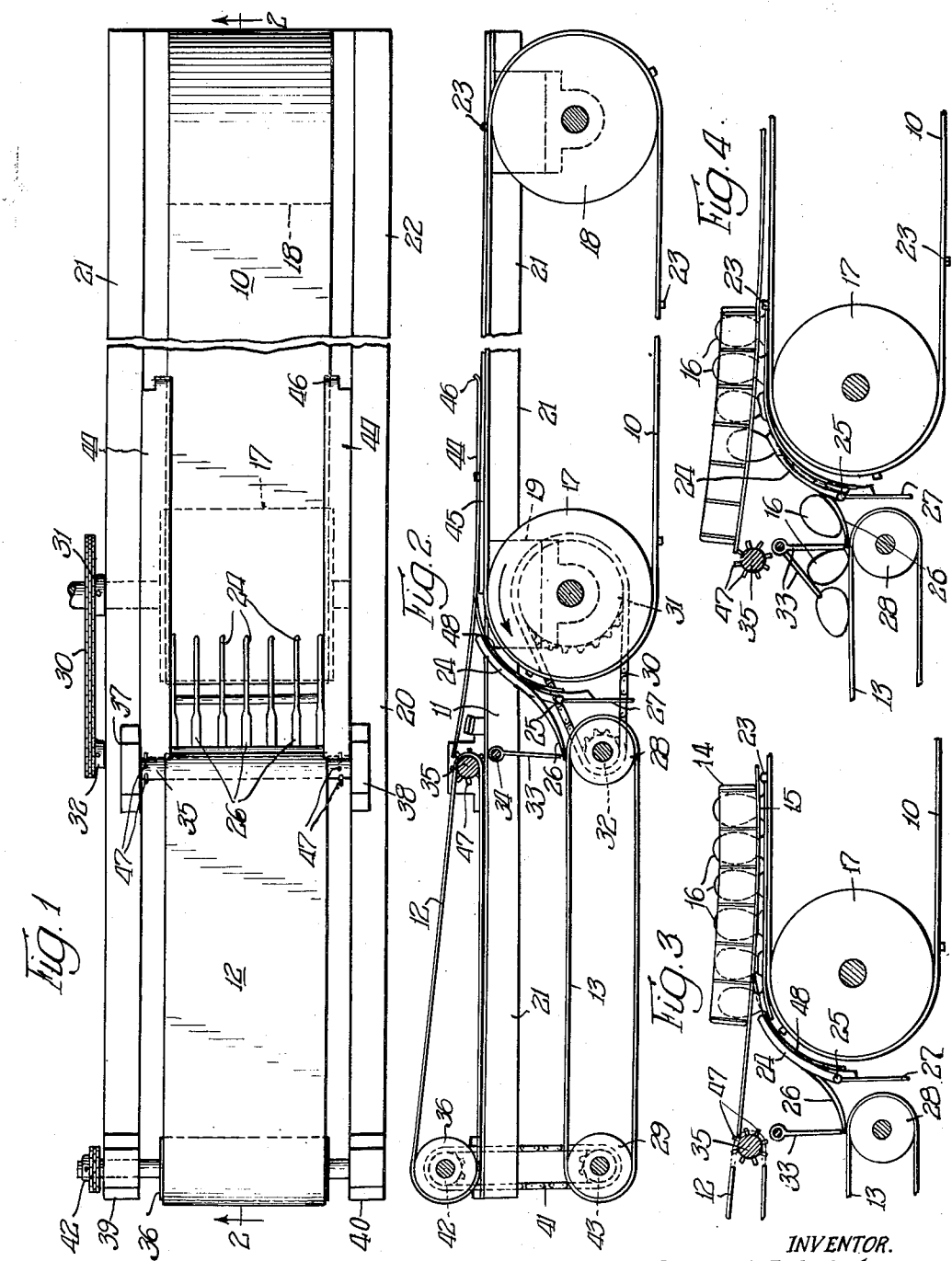
INVENTOR.
Edward W. Fahey,
BY Cromwell, Greist & Warden
Att'ys

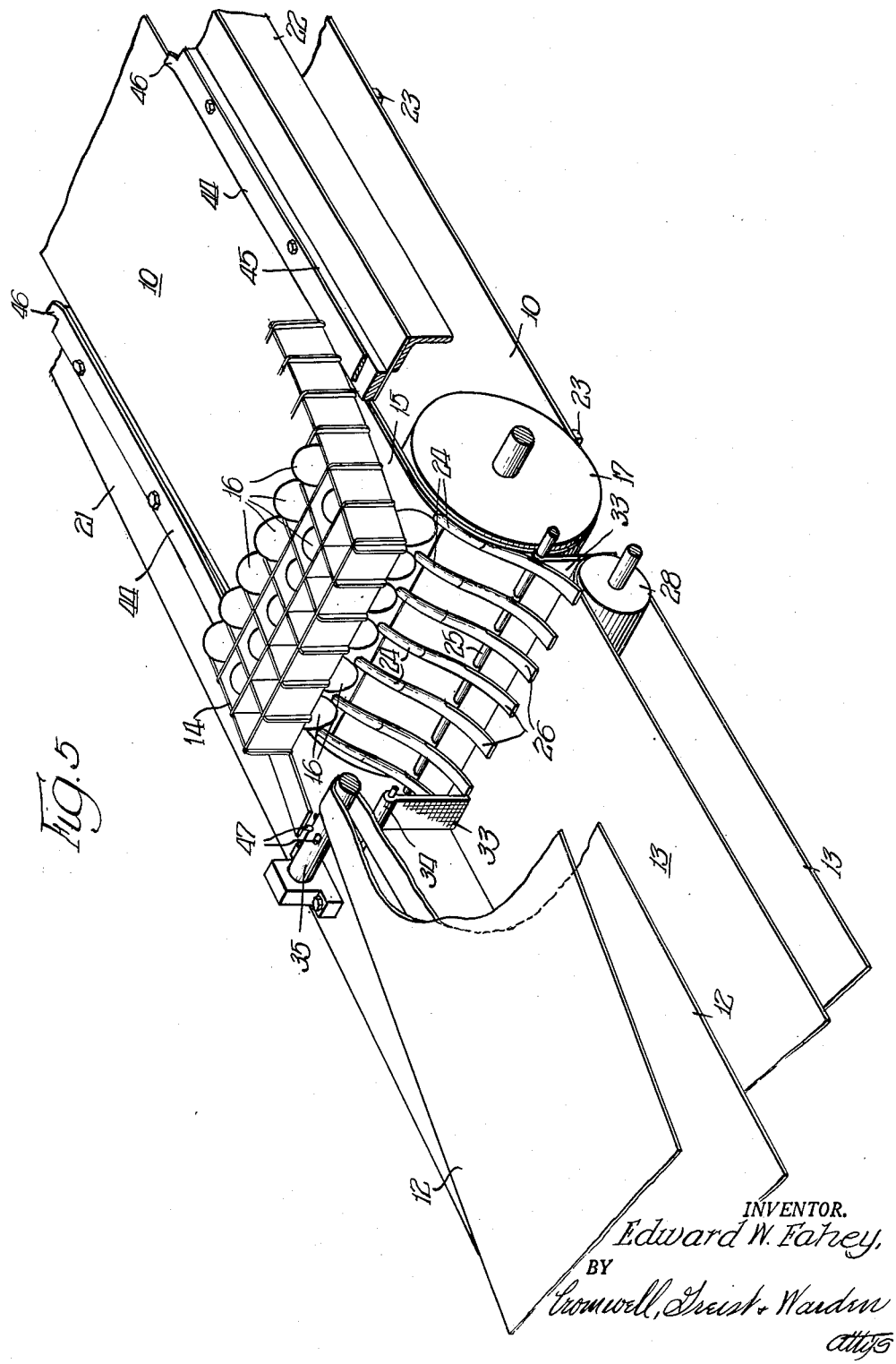

Patented Nov. 11, 1952

2,617,543

UNITED STATES PATENT OFFICE 2,617,543

EGG HANDLING APPARATUS

Edward W. Fahey, Chicago, Ill., assignor to Shellmar Products Corporation, Chicago, Ill., a corporation of Delaware Application December 3, 1947, Serial No. 789,439

10 Claims. (Cl. 214—1.1)

This invention is concerned with mechanism for handling eggs and particularly relates to an improved mechanism for separating the eggs from the filler and flat members in which they are conventionally packed for bulk shipment.

It is the general object of the invention to reduce the amount of handling required in removing eggs from the conventional egg case or crate in which the eggs are packed for bulk shipment. In such crates the eggs are positioned in cells provided by filler and flat members, the filler members being arranged in plural stacked relation in the crates and being separated by the flat members.

It is a more specific object of the invention to provide a mechanism for receiving a standard egg filler member which is wholly or partially filled with eggs and which is supported on a flat and for automatically separating the eggs from the cells of the filler and flat and thereafter transferring the eggs to a packing station or the like while at the same time conveying the filler and the flat members in different directions away from the eggs, for storage or re-use of the same as desired.

A still more specific object of the invention is to provide egg handling equipment comprising a plurality of conveyors and a separating mechanism which are so arranged that when a filler, supported on a flat and having a plurality of eggs therein, is positioned on the upper run of one of the conveyors it will be delivered to the separating mechanism where the flat and filler will be separated from the eggs and conveyed in separate directions while the eggs will be guided to another one of the conveyors for delivery to a packing station or the like.

These and other objects of the invention will be apparent from a description of the preferred form of the mechanism which is shown by way of illustration in the accompanying drawing, wherein:

Fig. 1 is a plan view of a mechanism embodying the principles of the invention;

Fig. 2 is a longitudinal section taken on the line 2—2 of Fig. 1;

Fig. 3 is a partial side elevation of the mechanism in operation and illustrating the beginning of the separating operation;

Fig. 4 is a partial side elevation similar to Fig. 3 illustrating a later stage in the separating operation; and Fig. 5 is an enlarged perspective view of the mechanism, with parts broken away, illustrating another stage in the separating operation.

Referring to the drawings, the invention is illustrated in a mechanism which comprises an endless receiving conveyor 10, a separating station 11 and endless delivery conveyors 12 and 13 which are arranged as illustrated.

The receiving conveyor 10 is arranged to accommodate on its upper run an egg carrying filler assembly consisting of the cellular egg filler member 14, the flat or separator member 15 on which the filler member 14 is supported and a plurality of eggs 16 arranged in the cells of the filler member 14.

The conveyor 10 is of a width approximately the same as the width of the filler member 14 which, as illustrated in the drawings, is the size provided for use in a standard egg crate, or case, of 30-dozen capacity. The filler 14 and the accompanying eggs 16 are supported on a conventional flat 15 which, as illustrated, may be formed of molded pulp and provided with cup-shaped formations or pockets for receiving and supporting the ends of the eggs. The flat 15 constitutes a separator between adjacent fillers 14 when they are stacked in a tier in the case.

The conveyor 10 includes relatively large forward and rear belt supporting rollers 17 and 18, respectively, which are mounted on bearing blocks 19 and 20, the latter depending from spaced lateral side rails 21 and 22. Either roller 17 or 18 may be driven from a suitable source of power. The upper run of the conveyor is positioned for movement in the plane of the upper surfaces of spaced side rails 21 and 22. The forward roller 17 which constitutes the discharge end of the conveyor 10 is located at the separating station 11. Transverse cleats 23 are provided in spaced relation along the surface of conveyor 10 to insure positive forward movement of the egg carrying filler assembly when it is placed thereon.

A series of egg guideway forming members 24 are arranged in spaced relation across the length of the roller 17. A sufficient number of the members 24 are provided to form six egg guideways for receiving the eggs from the six cells which constitute the forward row in the filler member 14. The members 24 extend upwardly and are curved to conform generally to the curvature of the roller 17. The members 24 are supported on a cross rod 25 which is positioned forwardly of and in spaced relation to the surface of the conveyor belt as it passes around the roller 17. Sufficient space is provided between members 24 and the roller 17 to accommodate the egg flat 15 as it is discharged from the conveyor 10, the upper ends of the members 24 being positioned a sufficient distance above the upper run of the conveyor 10 to intercept the flat 15.

The guideway forming members 24 are generally rod-like with their upper portions formed of or covered with a relatively soft material, such as rubber, to prevent breakage of the eggs 16 which they receive in guiding relation as the eggs 16 are released from the filler 14. Each of the members 24 is provided with a depending curved extension 26 which extends to and terminates at the receiving end of the upper run of the egg delivery conveyor 13. The extensions 26 cooperate with the members 24 to guide the eggs 16 as they move downwardly by gravity. The extension members 26 may be formed of somewhat flexible material such as leather, rubber, or the like or they may be formed of stiff material and covered with a softer material so that they will handle the eggs without breakage.

The supporting rod 25 for the members 24 carries a depending flap 27 which extends downwardly between the roller 17 of the conveyor 10 and the smaller belt supporting roller 28 which constitutes the receiving end of the egg delivery conveyor 13. The flap 27 is spaced from the roller 17 and guides the egg flats 15 downwardly between the rollers 17 and 28. The flats 15 may be received into a storage bin beneath the mechanism or conveyed away in any desired manner for storage or re-use.

The egg delivery conveyor 13 is arranged with its upper run at a substantially lower level than the upper run of the conveyor 10 so that the eggs move downwardly by gravity as they leave the filler 13 being guided by the guide forming members 24 and 26. The conveyor 13 includes belt supporting rollers 28 and 29, the latter being positioned at the separating station 11 in forwardly spaced relation to the roller 17 of conveyor 10. The rollers 28 and 29 are mounted in bearings (not shown) which may be supported from the side rail members 21 and 22 or by any other convenient supporting structure. The conveyor 13 is driven in the same direction as conveyor 10 by chain 30 and cooperating sprockets 31 and 32 keyed to the shafts of rollers 17 and 28, respectively.

A plurality of depending flap members 33 are supported by a cross rod 34 which is mounted between the side rails 21 and 22 immediately above the roller 28. The flap members 33 are hingedly mounted on the rod 34 and provide a buffer for each of the guideways formed by the members 24 and 26 to prevent successive eggs from striking each other as they move down the guideways and are conveyed away by the conveyor 13.

The conveyor 12 is mounted with its upper run somewhat above the upper run of the conveyor 10 and includes forward and rearward belt supporting rollers 35 and 36. The rollers 35 and 36 are mounted in bearing members 37, 38 and 39, 40, respectively, which are supported on the side rail members 21 and 22. The roller 36 is driven by a chain 41 and sprockets 42 and 43 which are secured on the shafts of the rollers 35 and 36, respectively. The roller 35 is located in a generally vertical direction above the roller 32 on the conveyor 13 and in substantial spaced relation to the roller 17 on the conveyor 10.

A pair of laterally spaced side guide plates 44 are secured at one end to the top of the side rails 21 and 22. A spacer member 45 positions the ends of the guide plates 44 a sufficient distance above the upper run of conveyor 10 to accommodate the egg flat 15. The end of each of the guide plates 44 is curved upwardly at 46 to guide the flat 15 beneath the plate. Each of the guide plates 44 extends to the shaft of the roller 35, with the free end thereof resting on circumferentially spaced pins 47 provided adjacent the ends of the shaft for vibrating the plates 44. The guide plates 44 are spaced apart a distance somewhat less than the distance between the outer ends of the partition members of the filler 14 so that, as the filler is moved along by means of the transverse cleats or fingers 23 on the conveyor 10, rotation of the roller 35 vibrates, or shakes, the filler 14 sufficiently to dislodge the eggs 16 from the filler cells. The filler 14 moves upwardly and forwardly with its lateral ends supported on the guide plates 44 and is carried away by the conveyor 12.

A pair of side guide plates 48 extend downwardly from the side guide plates 44 in spaced relation to the periphery of the roller 17. These guide plates are spaced from the belt 10 as it passes around the roller 17 a sufficient distance to accommodate the egg flat 15. They engage the side edges of the flat 15 and cooperate with members 24 to direct the flat downwardly away from the filler 14 and eggs 16.

In using the mechanism an egg carrying assembly, comprising a filler 14 and a supporting flat 15 with the eggs 16 in the cells of the filler 14 and resting in the pockets in the flat 15, is placed on the upper run of the conveyor 10 in position between the side rails 21 and 22. As the assembly moves forward the turned-up ends 46 on the guide plates 44 separate the filler 14 and the supporting flat 15. The ends of the filler 14 ride on and are supported by the spaced guide plates 44. As the movement continues, the filler 14 is vibrated by the plates 44 thus insuring that all the eggs are shaken loose from the cells. As the assembly moves forwardly and the forward row of eggs reaches the guide members 24 the flat 15 is directed by the guide members 24 and the side guides 48 downwardly along the surface of the roller 17 by guides around the roller, the eggs are guided by the members 24 and 26 onto the top run of the conveyor 13 and the filler 14 is moved forwardly on the side guide plates 44. The flat 15 is separated from the filler 14 and the eggs 16 and passes downwardly between the roller 17 and 28 to storage or other disposition. The eggs 16 are conveyed away by the conveyor 12 to a packing station or the like. The filler 14 moves along the plates 44 to the upper run of the conveyor 12 by which it is conveyed away for storage or further use.

While specific details of construction and materials have been referred to in describing the illustrated form of the mechanism, other details of construction and other materials may be resorted to within the spirit of the invention.

I claim:

1. Egg handling equipment comprising two horizontally aligned endless conveyors having their upper runs arranged at different levels and traveling in the same direction, the conveyor having the uppermost run being of a sufficient width to accommodate an assembly consisting of an egg filler having a plurality of rows of eggs therein and a flat supporting said filler, means for separating the filler and the flat arranged adjacent the delivery end of said conveyor, guideway forming means arranged between the delivery end of said conveyor and the upper run of the other one of said conveyors to receive the eggs as they are released from the filler and to guide them onto the upper run of said other conveyor, said guideway forming means being spaced from the delivery end of said first conveyor a sufficient distance to permit the passage of the egg flat, and means for receiving the empty filler as it is delivered from the upper run of the first conveyor.

2. Egg handling equipment as recited in claim 1 and hingedly mounted buffer means cooperating with said guideway forming members for preventing contact of successive eggs as the eggs move along said guideway forming members and onto said other conveyor.

3. Egg handling equipment comprising two endless conveyors having their upper runs arranged at different levels and traveling in the same direction, the conveyor having the uppermost run being of a sufficient width to accommodate an assembly consisting of an egg filler member having a plurality of rows of eggs therein and a flat supporting said filler member, means including vibrating side guide plates for separating the filler member from the flat and the eggs, parallel guideway forming members between said conveyor and the upper run of the other one of said conveyors to receive the eggs as they are released from the filler and to guide them onto the upper run of said other conveyor, said guideway forming members being arranged to intercept the supporting flat member and guide the same away from the filler member and the eggs, and means for receiving the empty filler as it is delivered from the upper run of the first mentioned conveyor.

4. In a mechanism for removing eggs from a standard egg crate filler comprising generally parallel upper and lower conveyors arranged in vertically spaced relation, a third conveyor of a sufficient width to support on its upper run an egg crate filler assembly consisting of a filler member having a plurality of eggs therein and a supporting flat member, said third conveyor being arranged with the delivery end of the upper run terminating between the receiving ends of the two vertically spaced conveyors, guideway forming members arranged in transversely spaced relation between the delivery end of said third conveyor and the upper run of the lower one of said first mentioned conveyors for receiving eggs from the filler and delivering them to the lower conveyor, said guideway forming members being spaced from the third conveyor a sufficient distance to permit the passage of the egg flat downwardly away from the conveyors, laterally spaced guide plates extending from the end of the upper run of the third conveyor to the upper one of said first mentioned conveyors for guiding the empty filler member onto the upper conveyor, and means for vibrating said guide plates to insure that the eggs are dislodged from the filler.

5. In a mechanism for removing eggs from an egg crate filler comprising generally horizontal upper and lower conveyors arranged in vertically spaced relation, a third conveyor of a sufficient width to support on its upper run an assembly consisting of an egg filler member having a plurality of eggs therein and a supporting flat member, said third conveyor being arranged with the delivery end of the upper run terminating between the two vertically spaced conveyors, transversely spaced guideway forming members arranged between the delivery end of said third conveyor and the upper run of the lower one of said first mentioned conveyors for receiving eggs from the filler and guiding them to the lower conveyor, said guideway members being spaced from said third conveyor a sufficient distance to permit the passage of the flat member downwardly away from the conveyors, guide plates extending from adjacent the end of the upper run of said third conveyor to the upper one of said first mentioned conveyors for guiding the egg filler onto the upper conveyor, means on said upper conveyor for vibrating said last mentioned guide plates to insure removal of the eggs from the filler, and buffer means adjacent said egg receiving guideways for preventing successive eggs from contacting each other as they move along said guideways and onto said lower conveyor.

6. In an egg handling mechanism, an endless conveyor adapted to receive on its upper run an assembly comprising an egg filler member positioned on a flat and having rows of eggs therein, laterally spaced downwardly inclined egg guideways adjacent the delivery end of said conveyor, means above said conveyor for entering between the flat and the filler and for moving the same in opposite directions to permit the eggs to move by gravity onto said guideways, an egg delivery conveyor at the delivery end of said assembly receiving conveyor, said egg delivery conveyor being positioned to receive the eggs from the lower ends of said egg guideways and to convey the eggs therefrom, and hingedly mounted buffer members cooperating with said egg guideways for engaging successive eggs as they move down said guideways and onto said delivery conveyor.

7. Egg handling equipment comprising two aligned endless conveyors having their upper runs arranged at different levels and traveling in the same direction, the conveyor having the uppermost run being of a sufficient width to accommodate an assembly consisting of an egg filler member having a plurality of rows of eggs therein and a flat member therefor, means for directing the filler forwardly of the delivery end of said conveyor to permit the eggs therein to drop by gravity over said end of the conveyor, downwardly inclined egg guideway forming members arranged between the delivery end of said conveyor and the upper run of the other one of said conveyors to receive the eggs as they are released from the filler and to guide them onto the upper run of said other conveyor, swinging buffer members cooperating with said guideway forming means for engaging successive eggs as they move down said egg guideway forming means, and means for receiving the filler as it is delivered from the upper run of the first conveyor.

8. In a mechanism for removing eggs from a standard egg crate filler comprising generally parallel upper and lower conveyors arranged with their receiving ends in vertically spaced relation, a third conveyor of sufficient width to support on its upper run an egg crate filler assembly consisting of a filler member having a plurality of eggs therein and a flat member, said third conveyor being arranged with the delivery end of the upper run terminating adjacent the receiving ends of the vertically spaced conveyors, inclined guideway forming members arranged in transversely spaced relation and extending between the delivery end of said third conveyor and the upper run of the lower one of said first mentioned conveyors for receiving eggs from the filler and delivering them to the lower conveyor, guide means at the end of the upper run of the third conveyor and extending toward the upper run of the upper one of said first mentioned conveyors for guiding the filler member onto the upper conveyor, and means for vibrating said guide means to insure that the eggs are dislodged from the filler member.

9. In a mechanism for removing eggs from an egg carton filler comprising generally horizontal upper and lower conveyors arranged in vertically spaced relation, a third conveyor of a sufficient width to support on its upper run an assembly consisting of an egg filler member having a plurality of eggs therein and a flat member, said third conveyor being arranged with the delivery end of the upper run terminating between the upper runs of the two vertically spaced conveyors, transversely spaced downwardly inclined guideway forming members arranged between the delivery end of said third conveyor and the upper run of the lower one of said first mentioned conveyors for receiving eggs from the filler and guiding them to the lower conveyor, means adjacent the end of the upper run of said third conveyor for guiding the egg filler member onto the upper conveyor, means for vibrating said egg filler member as it passes between the conveyors to insure removal of the eggs from said filler member and buffer means adjacent said egg receiving guideway forming members for engaging said eggs as they move along said guideway forming members and onto said lower conveyor.

10. Mechanism for handling relatively fragile articles which are contained in an assembly which assembly consists of a cellular partition member and a separable flat member, said mechanism comprising an endless conveyor adapted to receive on its upper run the article filled assembly, means at the delivery end of said conveyor for directing the cellular member in an upward and forward direction, cooperating means for directing the flat supporting member in an opposite downward direction away from the cellular member thereby to release the articles therein and permit them to move by gravity over the end of the conveyor, an article delivery mechanism at the delivery end of said conveyor at a lower level than the upper run of said conveyor, guideway forming and separating means for receiving the articles in separated relation and for guiding them downwardly away from said cellular member and onto said delivery mechanism, and means for vibrating said cellular member as it is separated from the flat supporting member to insure release of the articles from said cellular member.

EDWARD W. FAHEY.

REFERENCES CITED

The following references are of record in the file of this patent:

UNITED STATES PATENTS

| Number | Name | Date |
|---|---|---|
| 612,375 | Bennett | Oct. 11, 1898 |
| 969,072 | Loomis | Aug. 30, 1910 |
| 1,279,562 | Lowell | Sept. 24, 1918 |
| 1,452,711 | Schroeder et al. | Apr. 24, 1923 |
| 1,454,051 | Heulings | May 8, 1923 |
| 1,866,809 | Kasser | July 12, 1932 |
| 2,074,383 | Funk | Mar. 23, 1937 |
| 2,323,852 | Seidel et al. | July 6, 1943 |
| 2,481,440 | Page | Sept. 6, 1949 |